H. SCHOENER.
GARDEN PLOW.
APPLICATION FILED MAR. 31, 1914.
1,101,149.
Patented June 23, 1914.
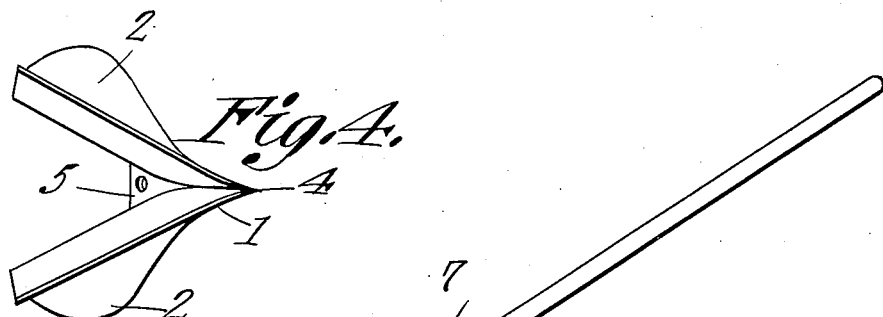
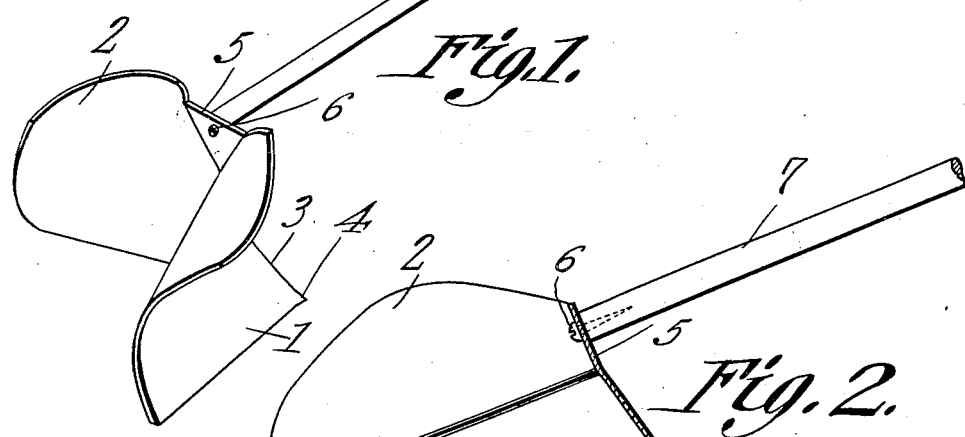
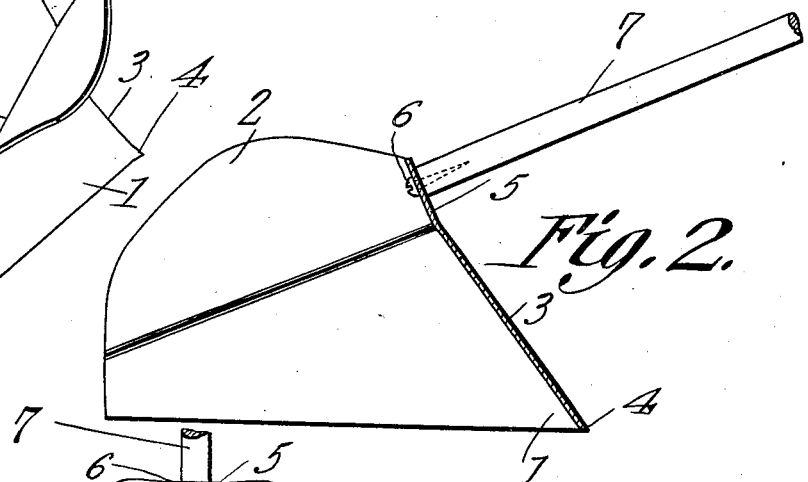
H. Schoener
Inventor

UNITED STATES PATENT OFFICE.

HERMAN SCHOENER, OF FREEPORT, MINNESOTA.

GARDEN-PLOW.

1,101,149.  Specification of Letters Patent. Patented June 23, 1914.

Application filed March 31, 1914. Serial No. 828,563.

*To all whom it may concern:*

Be it known that I, HERMAN SCHOENER, a citizen of the United States, residing at Freeport, in the county of Stearns and State of Minnesota, have invented a new and useful Garden-Plow, of which the following is a specification.

This invention relates to plows of that type known as garden plows, its object being to provide a light and durable device of this character having the handle extending forwardly from the soil engaging element so that the person manipulating the plow assumes a position in advance thereof where he will not trample the furrows formed by the plow.

A further object is to provide an implement of this character which is simple and durable in construction and can be produced and sold at small cost.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a perspective view of the implement. Fig. 2 is a central vertical section therethrough. Fig. 3 is a rear elevation. Fig. 4 is a bottom plan view of the soil engaging element.

Referring to the figures by characters of reference 1 designates a substantially V-shaped share having rearwardly diverging integral moldboards 2 which are curved outwardly at their upper ends. A ridge 3 extends upwardly and rearwardly along the front portion of the share and is formed by pinching the share together as shown particularly in Fig. 4, the lower end of the ridge and the lower edges of the share converging to the point 4. The upper end portion of the ridge 3 merges into a triangular transversely extending web 5 preferably inclined upwardly and rearwardly as shown in Fig. 2 and this web is designed to receive a bolt 6 or other fastening element whereby an elongated handle 7 is connected to the web.

It will be apparent that when using an implement such as herein described, the person manipulating the same will walk in front of the implement and draw it toward him. Consequently, the danger of trampling the furrow produced by the implement is avoided. Furthermore, by reason of the peculiar configuration of the shares and moldboard, the digging action of the plow is improved and, as the entire soil engaging structure is formed in a single piece of metal, it will be seen that it can be produced cheaply by stamping it from a blank.

What is claimed is:—

An implement of the class described, including a V-shaped share formed at its front end with an upwardly and rearwardly inclined ridge, said share having outwardly curved moldboards integral therewith, a substantially triangular web extending transversely between and integral with the moldboards and above the ridge, and a handle extending from the web.

In testimony that I claim the foregoing as my own, I have hereto affixed my signature in the presence of two witnesses.

HERMAN SCHOENER.

Witnesses:
ED. CHROMEY,
JOS BUTTWEILER.

Copies of this patent may be obtained for five cents each, by addressing the "Commissioner of Patents, Washington, D. C."